United States Patent [19]
Niwa et al.

[11] Patent Number: 5,213,879
[45] Date of Patent: May 25, 1993

[54] VIBRATION DAMPING MATERIAL

[75] Inventors: Takahiro Niwa, Kanagawa; Yasuo Shimizu, Chiba, both of Japan

[73] Assignee: Nichias Corporation, Tokyo, Japan

[21] Appl. No.: 871,309

[22] Filed: Apr. 20, 1992

[30] Foreign Application Priority Data

Apr. 24, 1991 [JP] Japan ................................ 3-119023

[51] Int. Cl.$^5$ ........................ B32B 7/02; B32B 25/04; B32B 25/08
[52] U.S. Cl. .................................. 428/213; 428/462; 428/492; 428/493
[58] Field of Search ............... 428/492, 462, 493, 213

[56] References Cited
U.S. PATENT DOCUMENTS 5,063,098 11/1991 Niwa et al. ......................... 428/492

Primary Examiner—Thomas J. Herbert, Jr.
Attorney, Agent, or Firm—Flynn, Thiel, Boutell, & Tanis

[57] ABSTRACT

A plurality of viscoelastic layers in the form of rubber films are sandwiched between two constraint plates in the form of iron plates via polyamide adhesive films to form an alternatingly laminated structure. Materials of the respective elements are selected so that their degrees of elasticity satisfy the relationship: constraint plate > adhesive layer > viscoelastic layer. The thickness of each rubber film is limited below a predetermined value to maintain its thermal and pressure resistance, and the rubber films are laminated up to a total thickness required for obtain a desired vibration damping property. The vibration damper, thus obtained, is excellent in vibration property, thermal and pressure resistance, and resistance against oils and solvents, and effective even under a severe environment.

2 Claims, 7 Drawing Sheets

VIBRATION DAMPING PROPERTY
(TEMPERATURE CHARACTERISTIC)

VIBRATION DAMPING MATERIAL

BACKGROUND OF THE INVENTION

1. Field of the Invention

This invention relates to an improvement of a vibration damping material made by laminating a viscoelastic rubber sheet on a constraint plate such as a metal plate.

2. Description of the Prior Art

Recently, soundproofing materials are used in a wide range of industrial fields from cars to electrical appliances to building materials. They play a great role for reducing noise which has been regarded as a serious social problem.

Among them, vibration dampers, in particular, have been remarked as materials for absorbing vibration which causes a noise. Such vibration damping materials are generally classified, from the structural viewpoint, into those of a two-layered type (unconstraint type) made by providing a viscoelastic layer of rubber or synthetic resin on a metal plate and those of a three-layered type (constraint type) made by sandwiching a viscoelastic layer between two metal plates.

A non-constraint type vibration damping material is intended to absorb vibration by converting the vibrating energy into kinetic energy by extensional/contractile deformation of its viscoelastic layer. A constraint type vibration damping material is intended to absorb vibration by converting the vibrating energy into kinetic energy principally by shearing deformation of its viscoelastic layer.

Many of conventional vibration damping materials are of a constraint type which commonly uses a hot-melt-adhesive layer also as a viscoelastic layer (alternatively, gives an adhesive property to the viscoelastic material) and sandwiches the layer between two metal plates. In this case, the use of a hot-melt-adhesive synthetic resin film as the adhesive layer facilitates continuous bonding of layers and mass-production at a lower cost. It, however, sometimes involves a problem in adhesive property and vibration damping property, and some solutions have been proposed. Examples are: the use of a thermosetting adhesive to improve the adhesive strength, the use of a rubber sheet provided between metal plates to improve the vibration damping property, and so on.

These damping materials, however, still involve some problems.

Many of vibration dampers using a hot-melt-adhesive as the viscoelastic layer, even if having an excellent vibration damping property, are originally low in adhesive strength with the metal plates. Moreover, because of their own nature, they are not resistant against heat. When the temperature reaches the melting point (or the flow temperature), two metal plates may be peeled off. Further, because of an extreme decrease in elasticity (Young's modulus of elasticity), the viscoelastic material may flow out when compression is applied.

In contrast, vibration dampers using a thermosetting adhesive as the viscoelastic layer may be improved in adhesive strength by hardening the viscoelastic layer, sometimes, however, at the sacrifice of the vibration damping capacity.

In particular, both hot-melt-adhesive agents and thermosetting agents have viscoelastic characteristics as the nature of resins. That is, the vibration damping capacity (loss factor) has a sharp peak near the glass-transition temperature. As a result, the temperature range effective for damping vibration is very narrow (dependency to temperature is large), which means that such vibration damping materials are difficult to use. Moreover, in case that resistance against oils, solvents, and so forth, must be taken into consideration, more restrictions are imposed, and the range of actual use of the damping materials is limited.

In contrast, when a rubber sheet is used as the viscoelastic sheet and sandwiched between metal plates, it is possible to obtain a vibration damper that is small in temperature dependency and excellent in vibration damping property by controlling the viscoelastic property of rubber by adjusting the mixture ratio. Such a vibration damper may have satisfactory resistance against heat, pressure, oils and solvents. However, because of restrictions in manufacturing vulcanized rubber, it is difficult to produce a vibration damper that permits continuous bonding which facilitates mass production, like the above-indicated vibration damper using a hot-melt-adhesive agent. Even if possible, it is very difficult for the rubber sheet itself to have sufficient adhesive force effective for practical use, and other adhesive agent must be relied upon. In this case, the degree of elasticity relative to the rubber sheet must be taken into consideration when selecting an adhesive agent to be used. Otherwise, however excellent is the vibration capacity of the rubber sheet, it may become a weak point in the entirety of the vibration damper and may be readily affected by the vibration damping property of the adhesive itself. This leads to a number of secondary problems which require further consideration.

In general, rubber sheets and metal sheets are bonded by vulcanized adhesive. This method, however, makes continuous fabrication difficult; for example, only cut-sheet-scaled fabrication using a hot press is possible.

It is not sufficient for a vibration damper to merely have only a high vibration damping capacity. In actual applications, they are often used in severe environments where various factors such as temperature, pressure, oils, and solvents are applied alone or in combination, rather than in relatively moderate environments at normal temperature, under no load and in the atmosphere. There is thus still demanded a vibration damper that can sufficiently meets such requirements.

Below is presented a discussion on resistance of vibration dampers against heat, pressure, oils and solvents. In order to improve the resistance, it is necessary to decrease the burden by decreasing the thickness of the viscoelastic rubber sheet so as to decrease the absolute deforming amount with compression force. In contrast, in order to obtain a high vibration damping property, it is necessary to increase the absolute thickness of the viscoelastic rubber sheet. Therefore, the use of the rubber sheet is not suitable for overcoming the inconsistent requirements.

More specifically, an increase in thickness of the viscoelastic rubber sheet improves the vibration damping property but decreases the thermal and pressure resistance. Of course, a decrease in thickness improves the thermal and pressure resistance but reduces the vibration damping property which is inherently required to the vibration damper.

Since the vibration dampers discussed above have an advantage in one sense and a disadvantage in other sense, one or two of factors, such as high vibration damping property (low temperature dependency), thermal and pressure resistance, resistance to oils and solvents, and adaptability to continuous fabrication, must be chosen for each intended use.

OBJECT OF THE INVENTION

It is therefore an object of the invention to provide a vibration damping material that overcomes the inconsistent problems discussed above by satisfying all of high vibration damping property, thermal and pressure resistance, resistance against oils and solvents, and has sufficient strength for the use under severe environments.

SUMMARY OF THE INVENTION

The invention is based on a vibration damping material made by providing a viscoelastic rubber sheet on a constraint plate such as a metal plate, and it is characterized in that the viscoelastic sheet includes a plurality of rubber layers each having a limited thickness below a predetermined amount and that the respective rubber layers, or the rubber layer and the constraint plate, are bonded into a lamination by an adhesive agent having a degree of elasticity smaller than that of the constraint plate and larger than that of the viscoelastic rubber sheet.

Materials that can be used as the constraint plate, the viscoelastic rubber element and the adhesive agent of the vibration damping material according to the invention are indicated below.

Usable as the constraint plate are: a metal plate such as iron plate, aluminum plate, stainless plate, copper plate and so on; and a plate material from the ceramic industry such as calcium silicate plate, slate plate, plaster board and so on.

Usable as the viscoelastic rubber layer are: acrylonitrile-butadiene rubber (NBR), styrene-butadiene rubber (SBR), natural rubber (NR), butyl rubber (IIR), halide rubber, ethylene-propylene rubber, butadiene rubber, isoprene rubber, chloroprene rubber, acrylic rubber, silicon rubber, fluorine rubber, epichlorohydrin rubber, urethane rubber, polynorbornene rubber and ethylene acrylic rubber.

Usable as the adhesive layer are: adhesive agents such as urea resin, melamine resin, phenolic resin, epoxy resin, vinyl acetate, cyanoacrylate, polyurethane, α-olephinic-malein anhydride resin, water base polymer-isocyanate, reactive type acrylic resin, denaturated acrylic resin, vinyl acetate resin emulsion type, vinyl acetate copolymer resin emulsion type, EVA resin emulsion type, acrylic resin emulsion type, EVA hot melt type, elastomer hot melt type, polyamide hot melt type, synthetic resin solvent type, synthetic rubber latex type; and pressure sensitive adhesive agents such as solvent type rubber, water base type rubber, solvent type acrylic, water base type acrylic, silicone, hot melt type, liquid curing type.

In the vibration damping material having the foregoing construction, the thicker the entire viscoelastic sheet consisting of the rubber layers, the higher the vibration damping property.

Further, by using the multi-layered viscoelastic rubber sheet, the rigidity of the vibration damping material is large in the thickness direction but small in the lateral direction.

That is, when the viscoelastic rubber sheet is compressed in the thickness direction, the viscoelastic sheet swells out laterally in curved forms. In the laminated layer, however, the swelling-out is very small because movements of the rubber layers are restricted by the constraint plate or adhesion with the adhesive agent. Therefore, the laminated sheet ensures a large rigidity in the thickness direction. In contrast, with regard to the shearing deformation of the viscoelastic rubber layer in the horizontal direction, since the adhesive does not behave as a constraint condition, the same rigidity is obtained with both the single and laminated layers of rubber.

In other words, the laminated rubber has large rigidity in the thickness direction and softness typical of the viscoelastic rubber sheet, and restores the original position because of the recovery force of the viscoelastic rubber sheet itself. Therefore, high pressure resistance is realized, and a decrease in vibration damping property can be disregarded because the degree of moving freedom in the shearing direction is identical or similar to that of a thick single layer of rubber.

If the degrees of elasticity of the adhesive and the viscoelastic rubber sheet are opposite, that is, if the degree of elasticity of the adhesive is lower than that of the rubber, the vibration damper comes to exercise the vibration damping property of the softest layer of the adhesive. It is useless, however excellent is the vibration damping property of the rubber. This is contradictory to the intention.

It is ideal that the adhesive agent has a degree of elasticity on the order of the constraint plate so that compression of the adhesive layer may be fully disregarded. However, considering that bonding between the rubber layers or between the rubber layer and the constraint plate is necessary and for the purpose of preventing a decrease in manufacturing efficiency when the degree of elasticity of the adhesive layer is the same as or similar to that of the constraint plate, an adhesive having the degree of elasticity defined above must be selected.

DETAILED DESCRIPTION OF THE PREFERRED EMBODIMENT

Figure 1:
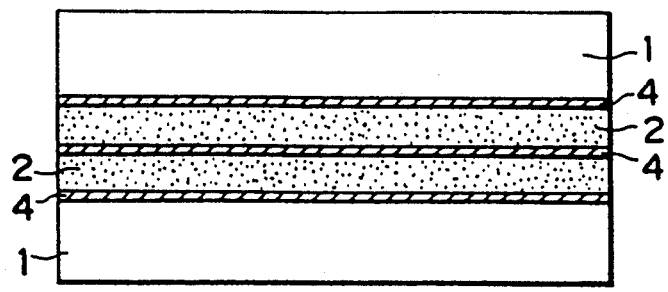
FIG. 1 is a side elevation of a vibration damper according to a first embodiment of the invention.

Embodiments of the invention are explained below with reference to the drawings.

Table 1 shows a specification of materials used in respective embodiments and comparison examples. The degrees of elasticity in Table 1 are those at 40° C. in the graph of FIG. 8 (degrees of elasticity variable with temperature).

TABLE 1

| element | material | thickness (mm) | elasticity (N/m²) 40° C. |
|---|---|---|---|
| constraint plate (1) | iron plate | 0.25 | $2.0 \times 10^{11}$ |
| viscoelastic layer (2) | vulcanized rubber (NBR) | 0.06 | $7.5 \times 10^{7}$ |
| viscoelastic layer (2') | vulcanized rubber (NBR) | 0.12 | $7.5 \times 10^{7}$ |
| viscoelastic layer (3) | polyethylene resin film | 0.10 | $3.3 \times 10^{6}$ |
| adhesive layer (4) | polyamide adhesive film | 0.03 | $1.6 \times 10^{8}$ |
| adhesive layer (5) | acrylic adhesive (pressure sensitive adhesive) | 0.10 | $2.7 \times 10^{5}$ |
| adhesive layer (6) | phenolic adhesive | 0.01 | $1.0 \times 10^{8}$ |

FIRST EMBODIMENT

The embodiment shown in FIG. 1 uses two iron plates as the constraint plates 1, NBR vulcanized rubber sheets as the viscoelastic layers 2, and polyamide adhesive films as the adhesive layers 4. The viscoelastic layers 2 and the adhesive layers 4 are sandwiched in an alternating fashion between the iron plates.

The iron plates underwent epoxy primer treatment in order to improve the adhesive strength with the polyamide adhesive films.

The vulcanized rubber films were prepared by applying a uniform thin coating of NBR rubber solved in a solvent, applying vulcanizing treatment at a predetermined temperature, and peeling off only the rubber film from the metal plate.

For making the lamination, after the respective elements were put in pile in sequence, they were bonded together by using a hot press at a temperature higher than the melting point while applying tension to opposite ends of the respective elements in order to remove wrinkles or blisters.

SECOND EMBODIMENT

Figure 2A:
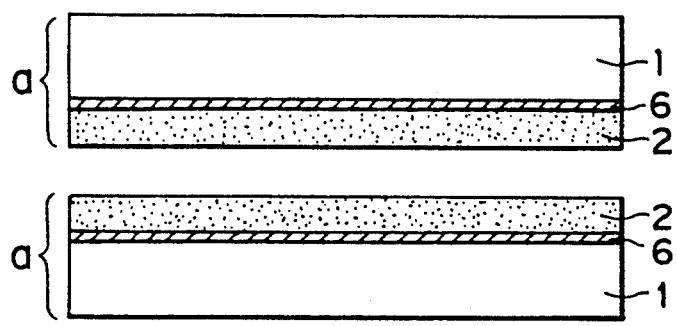
FIG. 2(a) shows side elevations of elements used in a second embodiment.
Figure 2B:
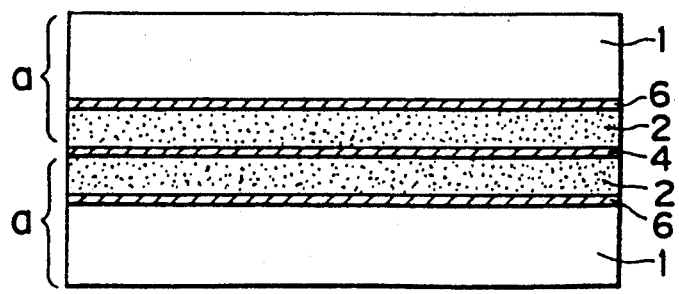
FIG. 2(b) is a side elevation of a vibration damper made by bonding the elements shown in FIG. 2(a).

In the embodiment shown in FIGS. 2(a) and 2(b), the constraint plate 1 was prepared by using a surface-treated iron plate. The iron plate was then coated with phenolic adhesive (adhesive layer 6) to increase the adhesive strength with rubber and to react on the iron plate. After this, a uniform thin coating of NBR rubber solved in a solvent was applied to form the viscoelastic layer 2, and it was dried and vulcanized. Thus the element (a) was prepared. Such elements (a) were bonded together by the adhesive layer 4 in the form of a polyamide adhesive film, and the structure is finally the same as that of the first embodiment.

For making the lamination, after the respective elements (a), (a) were put in pile, they were bonded together by using a hot press at a temperature higher than the melting point while applying tension to opposite ends of the polyamide adhesive film in order to remove wrinkles or blisters.

FIRST COMPARATIVE EXAMPLE

Figure 3:
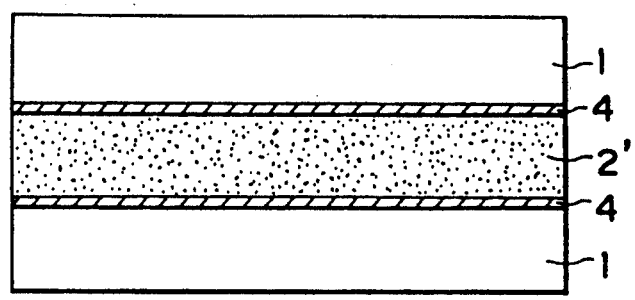
FIG. 3 is a side elevation of a vibration damper according to a first comparative example.

In the first comparative example shown in FIG. 3, a single viscoelastic layer 2' is used in lieu of the two viscoelastic layers 2, 2 in the first embodiment. The thickness is 0.06 mm to 0.12 mm.

SECOND COMPARATIVE EXAMPLE

Figure 4:
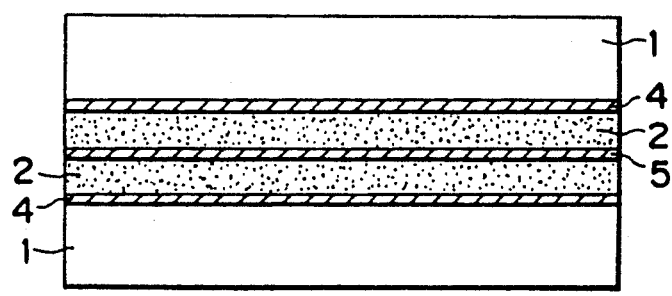
FIG. 4 is a side elevation of a vibration damper according to a second comparative example.

The second comparative example shown in FIG. 4 also has the same laminated structure as that of the first embodiment, except for the central layer being replaced by an adhesive layer of acrylic adhesive having a lower degree of elasticity than that of the viscoelastic layer.

For making the lamination of the NBR vulcanized rubber and the acrylic adhesive agent, hot press was applied at 50° C. for the benefit of stability because the acrylic adhesive agent has a self-adhesive property.

THIRD COMPARATIVE EXAMPLE

Figure 5:
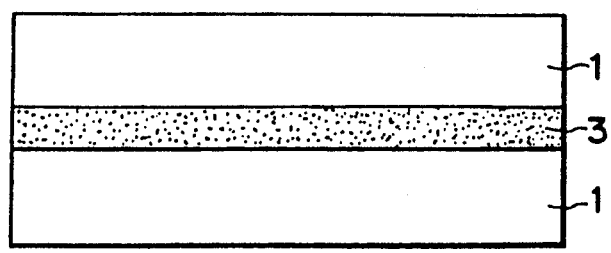
FIG. 5 is a side elevation of a vibration damper according to a third comparative example.

The third comparative example shown in FIG. 5 is a vibration damper having a most typical structure in which a polyethylene resin film 3 used in an actual vibration damping steel plate is sandwiched between two iron plates (constraint plates 1). The polyethylene resin film 3 is of a hot melt type which is melt at a temperature higher than the melting point and adheres to the iron plates when the temperature decreases. Epoxy primer treatment was applied to the iron plates in order to improve the adhesive strength with the polyethylene resin film 3.

For making the lamination, after the respective materials were put in pile, they were bonded together by using a hot press at a temperature higher than the melting point while applying tension to opposite ends of the polyethylene resin film 3 in order to remove wrinkles or blisters.

Figure 6:
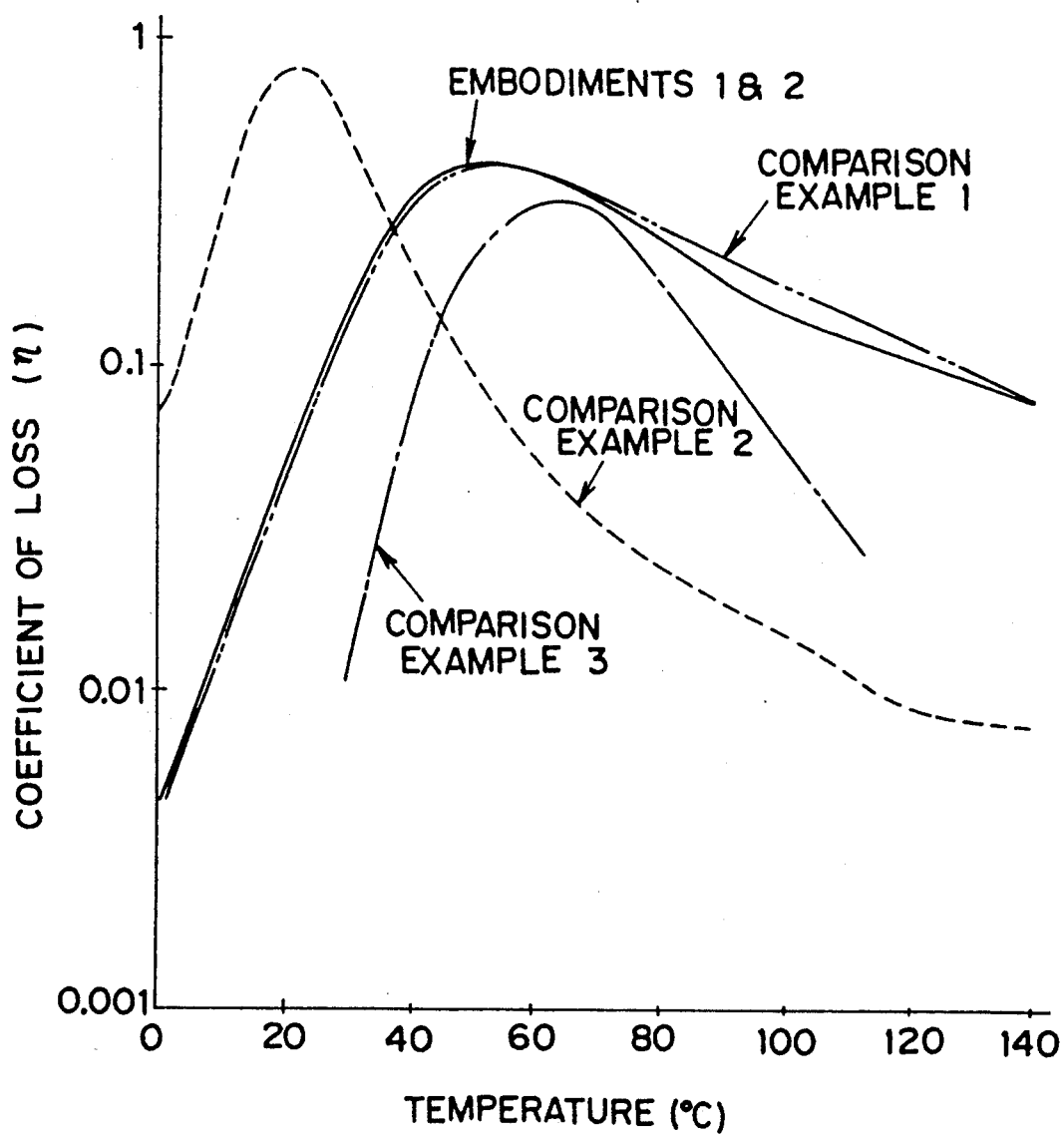
FIG. 6 is a graph showing vibration damping properties.

The graph of FIG. 6 shows vibration damping properties (temperature characteristics of loss factor $\eta$) of the embodiments and the comparative examples.

METHOD OF MEASURING VIBRATION DAMPING PROPERTIES

The mechanical impedance method was used.

An impedance head (a sensor for detecting exciting force and acceleration response simultaneously) was mounted in the center of a sample shaped into a rectangle, and it was excited by a random signal. The response of acceleration and force, thus obtained, was fast-Fourier-transformed (FET), and a frequency response function was obtained. The frequency response function is a change in inertance (=acceleration/force) with frequency, and a peak of inertance is obtained for each resonance frequency. The loss factor ($\eta$) was obtained by dividing the frequency width at a position lower than the peak value by 3 dB (half bandwidth=the energy becomes a half) by the resonance frequency.

Figure 7:
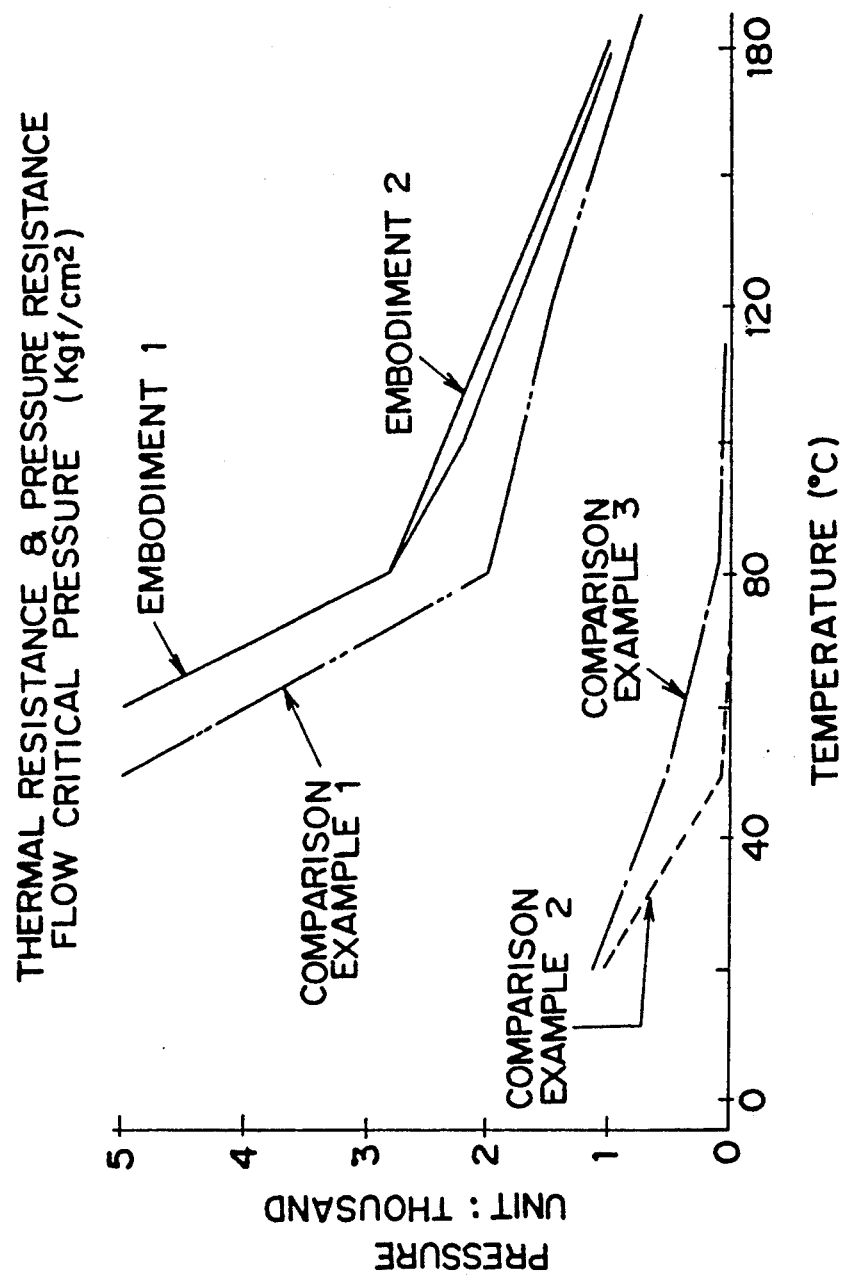
FIG. 7 is a graph showing thermal resistance and pressure resistance.

The graph of FIG. 7 shows thermal and pressure resistance.

METHOD OF MEASURING THERMAL RESISTANCE AND PRESSURE RESISTANCE

A sample of a vibration damper was set and pressed on a surface table of a hot-press tester at the predetermined temperature and pressure for a certain time to observe the samples's state (flowing and peeling of rubber and adhesive layers), and connection is made by a line between the temperatures and pressures at which no flowing, etc. occurred at all to obtain a critical curve of thermal and pressure resistance.

Figure 8:
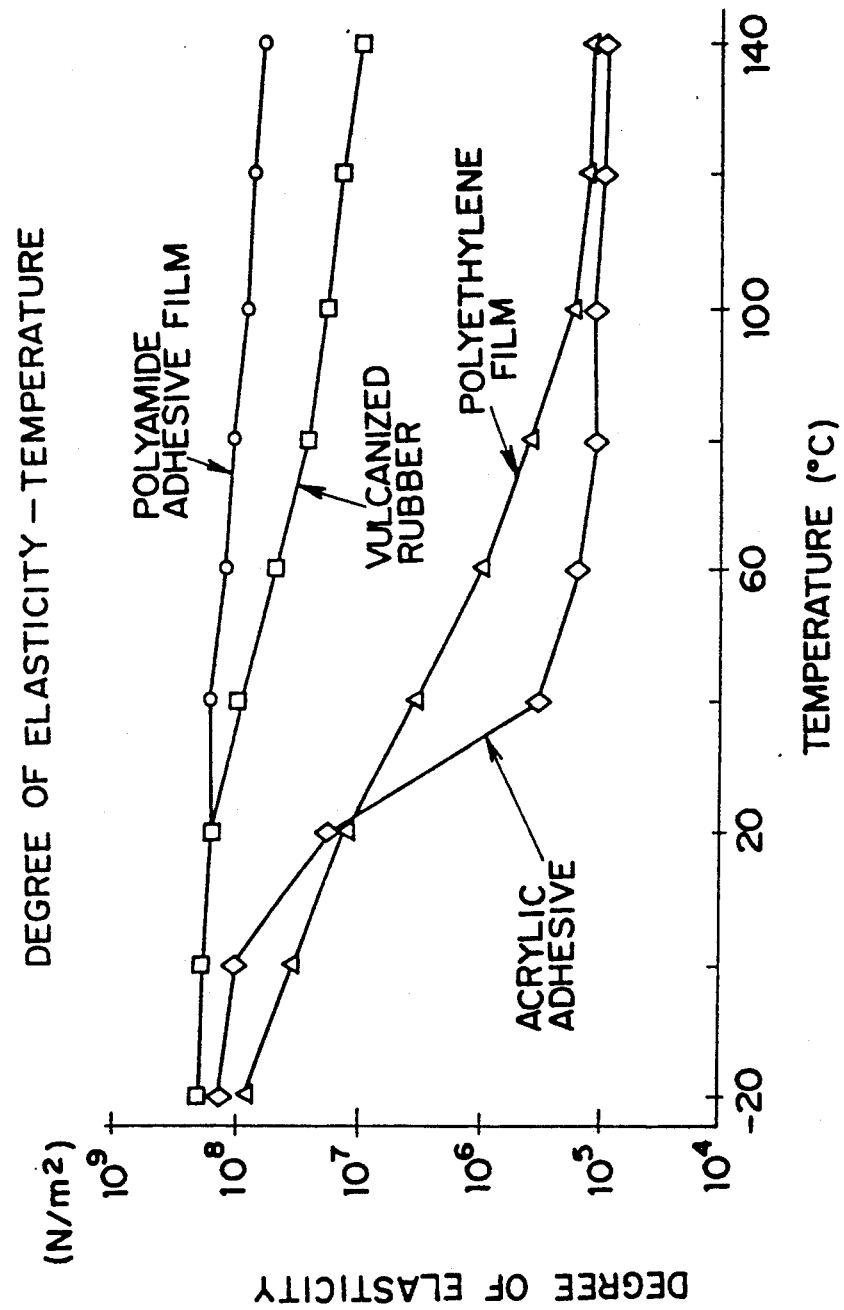
FIG. 8 is a graph showing degrees of elasticity.

The graph of FIG. 8 shows respective degrees of elasticity of rubber and adhesive layers. The degrees of elasticity were calculated by a viscoelasticity spectrometer.

Figure 9:
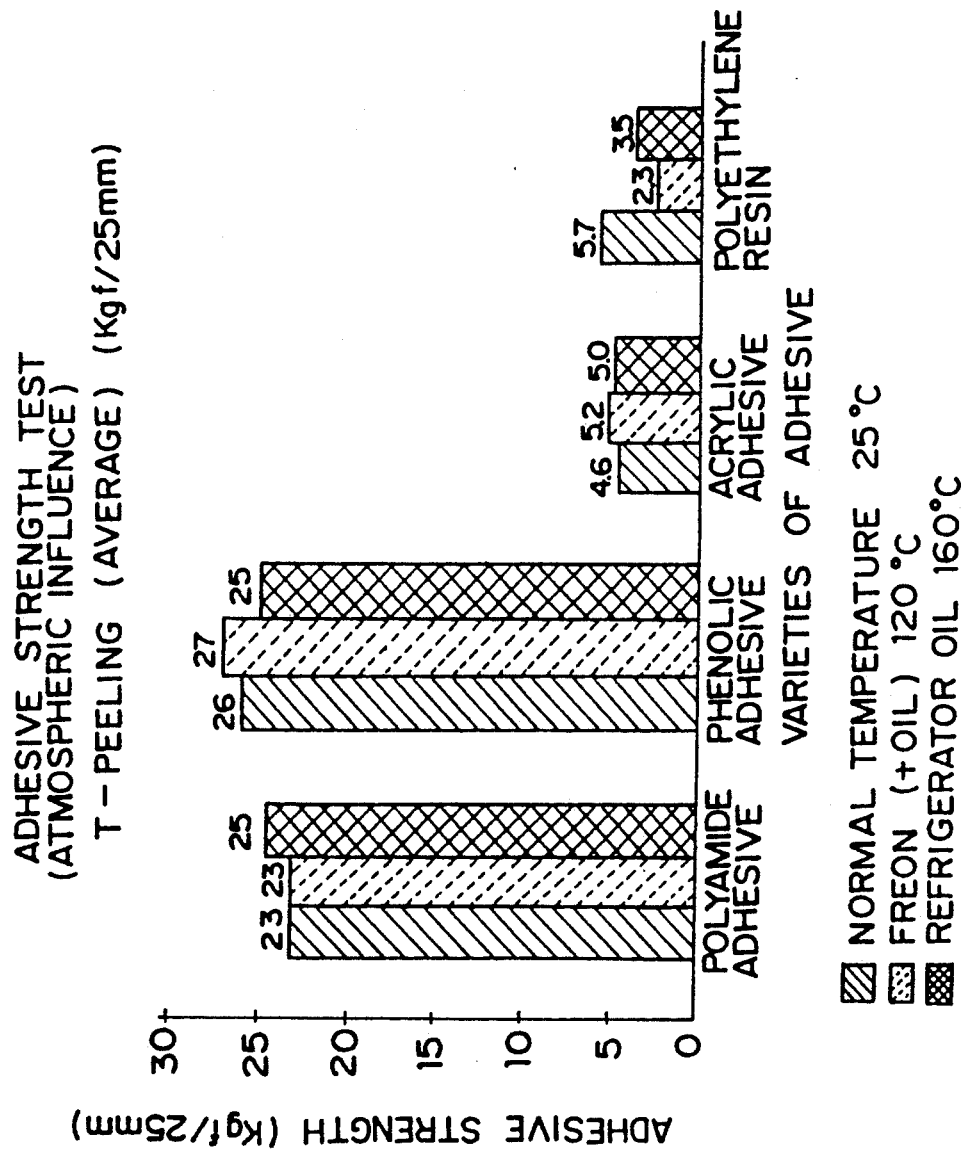
FIG. 9 is a graph showing adhesive strength.

The graph of FIG. 9 shows adhesive strength of adhesive agents.

TESTING METHOD

On the basis of the procedures of T-peeling testing, samples of vibration dampers were immersed in atmospheres such as Freon (oil) and a refrigeration machine oil under the predetermined conditions, followed by cooling at normal temperature. Thereafter, the samples were mounted on a tensile tester to determine their peeling strength.

Results of the tests performed on the embodiments and the comparative examples are indicated below.

FIRST EMBODIMENT

It not only exercises a high vibration damping property over a wide temperature range but also maintains high thermal and pressure resistance.

Moreover, as shown in the graph of FIG. 5, this is excellent also in resistance of the adhesive layer against oils and solvents, and it is the optimum structure.

SECOND EMBODIMENT

Substantially the same result was obtained, but the thermal and pressure resistance was slightly improved probably because the adhesive strength of the iron plates and rubber was increased by using the iron plates previously coated with rubber.

FIRST COMPARATIVE EXAMPLE

Although the vibration damping property was substantially the same as that of the first embodiment, the thermal and pressure resistance was decreased because each rubber layer was thick.

SECOND COMPARATIVE EXAMPLE

No vibration damping property of the rubber layer was observed throughout the entire temperature range. Only the vibration damping property of the acrylic adhesive (pressure sensitive adhesive) agent having a lower degree of elasticity was exercised. Since the degree of elasticity of the acrylic adhesive agent is significantly low, the thermal and pressure resistance was extremely low.

Moreover, the resistance against oils and solvents was not satisfactory.

THIRD COMPARATIVE EXAMPLE

Single polymer (polyethylene resin film in this example) was used as the viscoelastic layer, the vibration damping property was exercised only in a limited narrow temperature range. Further, since the degree of elasticity of the viscoelastic layer is low like that of the second comparative example, the thermal and pressure resistance was significantly low.

Moreover, the resistance against oils and solvents was not satisfactory.

As shown by the properties of the vibration dampers according to the embodiments, the invention can provide a vibration damper that is excellent in high vibration damping property (low temperature dependency), thermal and pressure resistance, and resistance against oils and solvents.

In other words, the invention gives solutions by limiting the thickness of each rubber layer below a predetermined value to maintain the thermal and pressure resistance and by combining a plurality of rubber layers into a lamination having a total thickness of viscoelastic rubber layers required for obtaining a desired vibration damping property.

In this connection, between the respective viscoelastic rubber layers are sandwiched adhesive layers, in alternating placement, which have a relatively high degree of elasticity and are unlikely to vary with heat and pressure.

Note, however, that the adhesive layer must be a material having a lower degree of elasticity than that of the constraint plate and having a degree of elasticity and a thickness which permit it to behave as a single viscoelastic layer together with the viscoelastic rubber layer upon shearing deformation caused by vibration.

Further, the adhesive layer used here need not have a vibration damping property. It is sufficient for it to insure strong bonding of respective viscoelastic rubber layers in an alternating form.

Particular attention is directed to that the adhesive layer must not prevent the vibration damping property of the viscoelastic rubber layer which is inherently required to exercise its vibration damping property. Otherwise, an expected characteristic is not obtained. For example, if an adhesive used has a lower degree of elasticity than that of the viscoelastic layer, the vibration damping property of the viscoelastic rubber layer is canceled by the vibration damping property of the adhesive, which invites adverse results such as narrowing the effective temperature range for vibration damping. Further, it produces few advantages even from the standpoint of thermal and pressure resistance and durability.

Therefore, it is important to choose an adhesive having a higher degree of elasticity than that of the viscoelastic rubber layer which is expected to exercise the vibration damping property. The relationship among the materials is shown in the following inequality:

degree of elasticity ($N/m^2$)

constraint plate > adhesive layer > viscoelastic rubber layer

Although the degrees of elasticity vary with temperature, it is sufficient for the respective elements to always satisfy the above inequality in intended use and intended temperature range. The most preferable range is: constraint plate (min. $1 \times 10^8$) > adhesive layer ($1 \times 10^{11} \sim 1 \times 10^7$) > viscoelastic rubber layer ($1 \times 10^9 \sim 1 \times 10^4$).

However, even when the inequality is met, if materials having low absolute values of elasticity are combined, the thermal and pressure resistance is necessarily reduced, although the vibration damping property may be acceptable. Selection of materials therefore relies on determination by a designer.

The thickness of each viscoelastic rubber layer of the multi-layered structure depends on the material used. In the embodiments, however, satisfactory results are obtained both in vibration damping property and in thermal and pressure resistance with a thickness in the range of 0.03 to 1.00 mm. An ideal thickness is 0.03 to 0.20 mm to obtain a more satisfactory result.

The best material of the viscoelastic layer is vulcanized rubber for the following reasons:

(1) It has a high compressive/tensile strength.

(2) It represents excellent recovery against compression.

(3) Its shearing elasticity is high over a wide temperature range. Its own vibration damping property is expected over a wide temperature range. Its durability is unlikely to vary with heat.

(4) Appropriate rubber adaptive to the nature of resistance against oils and solvents can be selected.

In addition, the illustrated embodiments, using metal plates previously coated with rubber, have the following advantages:

(1) Bonding between the metal plate and rubber is strong.

(2) Since the rubber is applied by coating, a thin rubber layer can be obtained.

(3) Lamination is easy.

The invention also give secondary advantages such as:

(1) Continuous production using a coil is possible.

(2) Stable quality is ensured.

Figure 10:
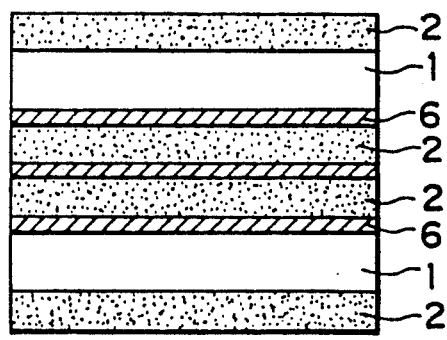
FIG. 10 is a side elevation of a third embodiment of the invention.

FIG. 10 shows a third embodiment of the invention which is a vibration damper also behaving as a seal. In this arrangement, viscoelastic rubber layers 2 and 2' are placed on opposite surfaces. Therefore, when the vibration damper is sandwiched between flanges of an engine block or the like, it is effective not only for suppressing vibration of the engine but also for preventing leakage of liquid from the engine.

As described above, the invention provides a satisfactory vibration damper excellent in vibration damping property, thermal and pressure resistance and resistance against oils and solvents, and effective under severe environments.

What is claimed is:

1. A constraint type vibration damping material in which a viscoelastic rubber sheet is provided between two constraint plates, characterized in that said viscoelastic rubber sheet includes a plurality of rubber layers each having a thickness smaller than a predetermined value and that an adhesive having a degree of elasticity smaller than that of said constraint plates and larger than that of said viscoelastic rubber sheet is used to bond respective said rubber layers and said rubber layer with said constraint plate to form a lamination.

2. A vibration damper according to claim 1 wherein an element is prepared by coating one or both of opposite surfaces of each said constraint plate with rubber, and two said elements are bonded together with said surfaces coated with rubber.

* * * * *